(12) United States Patent
Zhu et al.

(10) Patent No.: US 9,813,918 B2
(45) Date of Patent: Nov. 7, 2017

(54) METHOD AND DEVICE FOR DETERMINING WORKING MODE, NETWORK ELEMENT, ELEMENT MANAGEMENT SYSTEM (EMS) AND NETWORK MANAGEMENT SYSTEM (NMS)

(71) Applicant: ZTE Corporation, Shenzhen (CN)

(72) Inventors: Weihong Zhu, Shenzhen (CN); Hua Ni, Shenzhen (CN)

(73) Assignee: XI'AN ZHONGXING NEW SOFTWARE CO. LTD, Xi'An (CN)

( * ) Notice: Subject to any disclaimer, the term of this patent is extended or adjusted under 35 U.S.C. 154(b) by 0 days.

(21) Appl. No.: 14/911,675

(22) PCT Filed: May 19, 2014

(86) PCT No.: PCT/CN2014/077816
§ 371 (c)(1),
(2) Date: Jun. 6, 2016

(87) PCT Pub. No.: WO2014/180375
PCT Pub. Date: Nov. 13, 2014

(65) Prior Publication Data
US 2016/0286405 A1 Sep. 29, 2016

(30) Foreign Application Priority Data
Aug. 12, 2013 (CN) .......................... 2013 1 0350440

(51) Int. Cl.
H04W 4/00 (2009.01)
H04W 16/18 (2009.01)
H04W 24/02 (2009.01)

(52) U.S. Cl.
CPC .......... *H04W 16/18* (2013.01); *H04W 24/02* (2013.01)

(58) Field of Classification Search
USPC ............................... 455/433, 432.1
See application file for complete search history.

(56) References Cited

U.S. PATENT DOCUMENTS

2003/0200287 A1 10/2003 Vasamsetti
2004/0243712 A1* 12/2004 Sakai ................... H04L 41/00
709/227

(Continued)

FOREIGN PATENT DOCUMENTS

CN 101516093 A 8/2009
CN 101569221 A 10/2009

(Continued)

OTHER PUBLICATIONS

European Search Report for corresponding application EP 14 79 4093; Report dated Jul. 15, 2016.

(Continued)

*Primary Examiner* — David Q Nguyen
(74) *Attorney, Agent, or Firm* — Cantor Colburn LLP (57) ABSTRACT

Provided are a method and a device for determining a working mode, a network element, an Element Management System (EMS) and Network Management System (NMS). In the method, static importance of a base station or cell is determined according to static data of the base station or cell; dynamic importance of the base station or cell is determined according to dynamic data of the base station or cell; the working mode of the base station or cell is determined according to both the static importance and the dynamic importance. By virtue of the technical solution, the problem caused by the adoption of a dynamic mode or a static mode to determine the working mode of the base station or cell is solved, and the determination on the working mode of the base station or cell is more reliable and effective.

11 Claims, 5 Drawing Sheets

(56) References Cited

U.S. PATENT DOCUMENTS

| | | | | |
|---|---|---|---|---|
| 2013/0065582 A1* | 3/2013 | Jiang | ...................... | H04W 4/14 |
| | | | | 455/432.1 |
| 2015/0257044 A1* | 9/2015 | Jiang | ...................... | H04W 8/12 |
| | | | | 455/433 |
| 2016/0021508 A1* | 1/2016 | Dunkin | ............... | H04L 67/2847 |
| | | | | 701/518 |
| 2016/0212633 A1* | 7/2016 | Flanagan | .............. | H04W 24/02 |

FOREIGN PATENT DOCUMENTS

| | | |
|---|---|---|
| CN | 102685784 A | 9/2012 |
| WO | 2011055321 A2 | 5/2011 |

OTHER PUBLICATIONS

International Search Report for corresponding Application No. PCT/CN2014/077816 filed on May 19, 2014; dated Jul. 29, 2014.

\* cited by examiner

METHOD AND DEVICE FOR DETERMINING WORKING MODE, NETWORK ELEMENT, ELEMENT MANAGEMENT SYSTEM (EMS) AND NETWORK MANAGEMENT SYSTEM (NMS)

TECHNICAL FIELD

The present disclosure relates to the field of communications, and in particular to a method and a device for determining a working mode, a network element, an element management system and a network management system.

BACKGROUND

In a mobile communication network, generally, a hierarchical management mode is adopted to manage equipment (or network elements) in the entire communication network. Generally, there are different hierarchies of management systems, such as a Network Management System (NMS) and an Element Management System (EMS). The EMS mainly completes a function of an Element Management Layer (EML) in an International Telecommunications Union Telecommunications Management Network (ITU TMN), i.e., completes a management function of one or more pieces of mobile communication equipment (one or more network elements), and generally, the managed network elements are from the same equipment supplier. The NMS mainly completes a function of a Network Management Layer (NML) in the ITU TMN, and is in charge of managing all the network elements in a managed network. An interface between the NMS and the EMS is called a north interface (Itf-N). In general, an operator communicates with the EMS in the NMS through the north interface, thus fulfilling the aim of managing equipment of different manufacturers and relevant functions.

In view of a 3rd Generation Partnership Project (3GPP) specification, the north interface processing function on the NMS layer is called IRPManager, and the north interface processing function on the EMS layer is called IRPAgent. When the NMS interacts with the EMS through the north interface, actually, the NMS firstly interacts with the IRPManager, the IRPManager interacts with the IRPAgent through the north interface, and the IRPAgent interacts with the EMS, and vice versa. For the sake of simplicity and convenience, the application is described with the NMS and the EMS; however, in an actual process, as described above, the IRPManager and the IRPAgent may participate in the interaction.

As the application of a mobile communication system becomes more and more popular, the scale of the mobile communication system is larger and larger, and there are more and more areas being covered by the mobile communication network. To make up coverage holes in partial areas and meet the demand for the capacity of hot-spot areas, there are more and more small base stations (small cell nodes) being deployed into the mobile communication network, which results in the dramatic increase in the quantity of the base stations to be managed in the network. However, operators desire to still efficiently manage the network under the condition that the operation and maintenance cost (such as personnel and expenditures) is not increased. Aiming at this situation, a new request is made on the management systems of the mobile communication network, i.e., a management mode for on-demand management is proposed.

The on-demand management here means: equipment in the mobile communication network only submits management information to the management systems when required instead of submitting the information all the time as before. The aim of the on-demand management is to reduce the amount of data submitted through the north interface, so as to alleviate the pressure of the north interface, and also reduce data to be processed by management personal. At the present, the idea of the on-demand management is to classify the base stations or cells according to their importance, and determine whether the base stations or cells should work in an active mode or a passive mode according to the importance. To be specific, the base stations or cells are classified into important and unimportant ones; the important base stations or cells are set to work in the active mode, and the unimportant base stations or cells are set to work in the passive mode. The base stations or cells in the active mode will submit various types of data (performance data, tracking data, alarms, configuration informing messages and the like) in real time according to a traditional way, and the base stations or cells in the passive mode will not submit the data in real time but save the required data, and passively wait for the management systems to acquire the data when the data are needed.

In the relevant technology, a method for judging whether the base stations or cells are important is realized through a static mode (which is planned according to information such as historical data, positions and user situations of the base stations or cells) or a dynamic mode (which is decided dynamically according to dynamic data, such as the performance data, an operating state and a load situation, of the base stations or cells during operation). The base stations or cells are set to work in the active mode as long as they are judged to be important, and are set to work in the passive mode as long as they are judged to be unimportant. Therefore, the method is simpler.

The inventor, in a research process, finds that: when the static mode is adopted, the importance of the base stations or cells is fixed, and cannot be dynamically adjusted according to the operation situations of the base stations or the load situations of the cells, thereby the effect of better reducing interface data cannot be achieved; while when the dynamic mode is adopted, although the effect of reducing the amount of data at the interface is improved, the important base stations or cells may be set to work in the passive mode, thus causing a complaint on the quality of service.

At present, an effective solution aiming at the problem resulted by the adoption of either the dynamic mode or the static mode in the relevant technology when determining the working mode of the base stations or cells has not been provided yet.

SUMMARY

The embodiments of the present disclosure provide a method and a device for determining a working mode, a network element, an Element Management System (EMS) and a Network Management System (NMS), so as to at least solve the problem resulted by the adoption of either the dynamic mode or the static mode when determining the working mode of a base station or cell.

According to one aspect of the embodiments of the present disclosure, a method for determining a working mode is provided, which may include the following steps that: static importance of a base station or cell is determined according to static data of the base station or cell; dynamic importance of the base station or cell is determined according to dynamic data of the base station or cell; the working mode of the base station or cell is determined according to both the static importance and the dynamic importance.

In an example embodiment, the static data may include at least one of the following information: position information of the base station or cell, a level of profit generated by the base station or cell, an importance grade of a deployed or planned role of the base station or cell, the number of VIP users in a service scope of the base station or cell, and a priority attribute of the base station or cell.

In an example embodiment, the step that the static importance is determined may include a step that: the static importance is determined according to configuration information indicative of the static importance.

In an example embodiment, the dynamic data may include at least one of the following information: a current service volume situation of the base station or cell, the number of users accessing to the base station or cell, and the number of VIP users accessing to the base station or cell.

In an example embodiment, the step that the working mode of the base station or cell is determined according to both the static importance and the dynamic importance may include the following steps that: the static importance is determined to be in a first range and the dynamic importance is determined to be out of a second range, wherein the first range is a range representing that the static importance is important, and the second range is a range representing that the dynamic importance is important; the working mode of the base station or cell is determined to be an active mode.

In an example embodiment, the step that the working mode of the base station or cell is determined according to both the static importance and the dynamic importance may include the following steps that: the static importance is determined to be in a first range and the dynamic importance is determined to be in a second range, wherein the first range is a range representing that the static importance is important, and the second range is a range representing that the dynamic importance is important; the working mode of the base station or cell is determined to be an active mode.

In an example embodiment, the step that the working mode of the base station or cell is determined according to both the static importance and the dynamic importance may include the following steps that: the static importance is determined to be out of a first range and the dynamic importance is determined to be in a second range, wherein the first range is a range representing that the static importance is important, and the second range is a range representing that the dynamic importance is important; the working mode of the base station or cell is determined to be an active mode.

In an example embodiment, the step that the working mode of the base station or cell is determined according to both the static importance and the dynamic importance may include the following steps that: the static importance is determined to be out of a first range and the dynamic importance is determined to be out of a second range, wherein the first range is a range representing that the static importance is important, and the second range is a range representing that the dynamic importance is important; the working mode of the base station or cell is determined to be a passive mode.

In an example embodiment, the step that the working mode of the base station or cell is determined according to both the static importance and the dynamic importance may include the following steps that: comprehensive importance of the base station or cell is determined according to both the static importance and the dynamic importance; the comprehensive importance is determined to be in a third range, wherein the third range is a range representing that the comprehensive importance is important; the working mode of the base station or cell is determined to be an active mode.

In an example embodiment, before the step that the comprehensive importance of the base station or cell is determined, the method further includes a step that: the static importance is determined to be out of a first range, wherein the first range is a range representing that the static importance is important.

In an example embodiment, the step that the comprehensive importance of the base station or cell is determined according to both the static importance and the dynamic importance includes the following step that: the static importance and the dynamic importance is subjected to adding calculation to obtain the comprehensive importance; or the static importance and the dynamic importance is subjected to weighted average calculation to obtain the comprehensive importance, wherein the static importance has a first weight coefficient, and the dynamic importance has a second weight coefficient.

According to another aspect of the embodiments of the present disclosure, a device for determining a working mode is further provided, which includes: a first determination component configured to determine static importance of a base station or cell according to static data of the base station or cell; a second determination component configured to determine dynamic importance of the base station or cell according to dynamic data of the base station or cell; a third determination component configured to determine the working mode of the base station or cell according to both the static importance and the dynamic importance.

In an example embodiment, the third determination component includes: a first determination unit configured to determine that the static importance is out of a first range and the dynamic importance is in a second range, wherein the first range is a range representing that the static importance is important, and the second range is a range representing that the dynamic importance is important; a second determination unit configured to determine that the working mode of the base station or cell is an active mode.

In an example embodiment, the third determination component includes: a third determination unit configured to determine comprehensive importance of the base station or cell according to both the static importance and the dynamic importance; a fourth determination unit configured to determine that the comprehensive importance is in a third range, wherein the third range is a range representing that the comprehensive importance is important; a fifth determination unit configured to determine that the working mode of the base station or cell is an active mode.

According to another aspect of the embodiments of the present disclosure, a network element is provided, which includes: the above device for determining a working mode.

According to another aspect of the embodiments of the present disclosure, an element management system is provided, which includes: the above device for determining a working mode.

According to another aspect of the embodiments of the present disclosure, a network management system is provided, which includes: the above device for determining a working mode.

According to the embodiments of the present disclosure, by the adoption of the method that determines the static importance of the base station or cell according to the static data of the base station or cell, determines the dynamic importance of the base station or cell according to the dynamic data of the base station or cell, and determines the working mode of the base station or cell according to both the static importance and the dynamic importance, the problem caused by the adoption of either the dynamic mode or the static mode to determine the working mode of the base station or cell is solved, and the determination on the working mode of the base station or cell is more reliable and effective.

BRIEF DESCRIPTION OF THE DRAWINGS

The drawings are described here to provide further understanding of the present disclosure, and form a part of the present disclosure. The schematic embodiments and description of the present disclosure are adopted to explain the present disclosure, and do not form improper limits to the present disclosure. In the drawings.

DETAILED DESCRIPTION OF THE EMBODIMENTS

It should be noted that the embodiments of the present disclosure and the characteristics in the embodiments can be combined under the condition of no conflicts. The present disclosure is described below with reference to the drawings and the embodiments in detail.

The steps shown in the flowcharts of the drawings may be executed in a computer system such as a group of computer executable instructions. In addition, although the flowchart shows a logic sequence, under some circumstances, the steps shown or described can be executed according to a sequence different from the logic sequence here. For example, the sequences of the step S102 and the step S104 in the method below can be interchanged.

Figure 1:
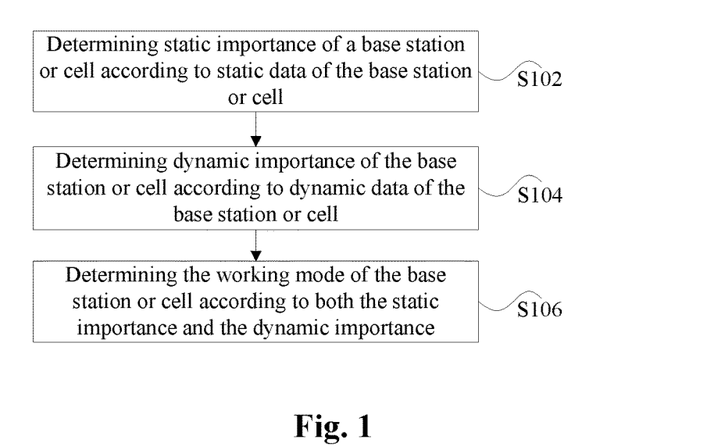
FIG. 1 is a flowchart of a method for determining a working mode according to an embodiment of the present disclosure.

The embodiment provides a method for determining a working mode. FIG. 1 is a flowchart of a method for determining a working mode according to the embodiment of the present disclosure. As shown in FIG. 1, the flow may include the following steps that:

S102: static importance of a base station or cell is determined according to static data of the base station or cell;

S104: dynamic importance of the base station or cell is determined according to dynamic data of the base station or cell;

S106: the working mode of the base station or cell is determined according to both the static importance and the dynamic importance.

By virtue of the steps above, the working mode of the base station or cell is subjected to comprehensive judgment according to both the static importance and the dynamic importance, thus overcoming the defects that the flexibility is low and a load on the north interface may not be effectively reduced due to the adoption of only the static mode, and avoiding the problem that the quality of user service is lowered as the important base station or cell is set to work in a passive mode due to the only adoption of a dynamic mode. According to the embodiment, the determination on the working mode of the base station or cell is more reliable and effective.

It should be noted that, to facilitate the calculation, the static importance and the dynamic importance may be quantified values or grades, and, of course, may also be expressed as importance degrees, for example, the static importance is important, unimportant, very important and the like.

In an example embodiment, the static data may include a configuration, an attribute or a historical service condition and the like of the base station or cell. For example, the static data may include but are not limited to at least one of the following information: position information of the base station or cell, a level of profit generated by the base station or cell within a certain time period, an importance grade of a deployed or planned role of the base station or cell, the number or the historical number of VIP users in a service scope of the base station or cell, and a priority attribute of the base station or cell.

In an example embodiment, under the condition that the priority attribute and the grade of the static importance are configured in a compatible way, a priority attribute of the base station or cell can be adopted as the static importance of the base station or cell. For example, if the priority attribute of the base station is set to be 3, the static importance of the base station can be determined to be 3. Of course, one or more other static data may also be adopted to comprehensively judge the static importance. The comprehensive judgment mode includes but is not limited to: adding, weighted average calculation and the like.

In an example embodiment, the static data can be set by a user or obtained by the base station or cell according to an operation situation thereof. In one example embodiment, the static importance of the base station or cell is directly set by the user, for example, the static importance of one base station or cell is set to be important or unimportant, or set to be a corresponding static importance grade according to the past experiences, the base station or cell determines the static importance according to configuration information which is configured by the user and used for indicating the static importance.

In an example embodiment, the dynamic data are data parameters that are changeable during operation of the base station or cell. The data parameters may be either current parameter values or parameter value change tendencies within a certain closer time period before the current time. In one example embodiment, the dynamic data include but are not limited to at least one of the following information: a current service volume situation of the base station or cell, the current number of users accessing to the base station or cell, the current number of VIP users accessing to the base station or cell, and a load situation of the base station or cell.

In the embodiment, there may be various manners for determining the working mode of the base station or cell according to both the static importance and the dynamic importance, and 5 manners are listed in the embodiment. It should be noted that: based on the 5 manners, other manners for determining the working mode of the base station or cell according to both the static importance and the dynamic importance can also be conceived.

Manner I

The static importance is determined to be in a first range and the dynamic importance is determined to be out of a second range, wherein the first range is a range representing that the static importance is important, and the second range is a range representing that the dynamic importance is important; the working mode of the base station or cell is determined to be an active mode.

In this manner, thresholds, i.e., the first range and the second range, are respectively set for the static importance and the dynamic importance. The first range and the second range may be either expressed by value ranges or degree ranges, for example: the first range is important, very important; or the first range is grade 2, grade 3 and the like. By virtue of this manner, a method for determining that the working mode of the base station or cell is the active mode is provided.

Manner II

The static importance is determined to be in a first range and the dynamic importance is determined to be in a second range, wherein the first range is a range representing that the static importance is important, and the second range is a range representing that the dynamic importance is important; the working mode of the base station or cell is determined to be an active mode.

In this manner, thresholds, i.e., the first range and the second range, are respectively set for the static importance and the dynamic importance. The first range and the second range can be either expressed by value ranges or degree ranges, for example: the first range is important, very important; or the first range is grade 2, grade 3 and the like. By virtue of this manner, a method for determining that the working mode of the base station or cell is the active mode is provided.

Manner III

The static importance is determined to be out of a first range and the dynamic importance is determined to be in a second range, wherein the first range is a range representing that the static importance is important, and the second range is a range representing that the dynamic importance is important; the working mode of the base station or cell is determined to be an active mode.

In this manner, thresholds, i.e., the first range and the second range, are respectively set for the static importance and the dynamic importance. The first range and the second range can be either expressed by value ranges or degree ranges, for example: the first range is important, or very important; or the first range is grade 2, grade 3 and the like. By virtue of this manner, a method for determining that the working mode of the base station or cell is the active mode is provided.

The manners from I to III may be further described below: if the static importance is determined to be in the first range, and/or the dynamic importance is determined to be in the second range, the working mode of the base station or cell is determined to be the active mode.

Manner IV

The static importance is determined to be out of a first range and the dynamic importance is determined to be out of a second range, wherein the first range is a range representing that the static importance is important, and the second range is a range representing that the dynamic importance is important; the working mode of the base station or cell is determined to be a passive mode.

In this manner, thresholds, i.e., the first range and the second range, are respectively set for the static importance and the dynamic importance. The first range and the second range can be either expressed by value ranges or degree ranges, for example: the first range is important, very important; or the first range is grade 2, grade 3 and the like. By virtue of this manner, a method for determining that the working mode of the base station or cell is the passive mode is provided.

In the manners above, when whether the static importance is in the first range or not and whether the dynamic importance is in the second range or not are determined, their determination sequences are not limited, i.e., whether the static importance is important or not can be determined at first, and whether the dynamic importance is important or not is determined then; or whether the dynamic importance is important or not can be determined at first, and whether the static importance is important or not is determined then.

In some example embodiments, whether the static importance is important may be determined at first, and whether the dynamic importance is important is determined then. This is because relative to the dynamic importance, the importance degree of the static importance is relatively fixed within a certain range of time. Therefore, within the certain range of time, the static importance may be determined only once, while the dynamic importance is determined for multiple times. The working mode of the base station or cell is determined respectively according to both the static importance and the dynamic importance.

In an example embodiment, the determination on the static importance or the determination on the dynamic importance may be performed periodically, or triggered through a certain triggering event, for example, under the condition that an instruction for determining the working mode is received, or under the condition that the thresholds of a certain data or multiple dynamic data of the base station or cell exceed a preset range, the determination on the dynamic importance or the static importance is triggered.

Manner V

Comprehensive importance of the base station or cell is determined according to both the static importance and the dynamic importance; the comprehensive importance is determined to be in a third range, wherein the third range is a range representing that the comprehensive importance is important; the working mode of the base station or cell is determined to be an active mode.

In this manner, comprehensive calculation processing is performed on the static importance and the dynamic importance to obtain the comprehensive importance, and the working mode of the base station or cell is determined according to the comprehensive importance is provided. The manner can determine the working mode of the base station or cell by further combining the manners above from I to IV.

In an example embodiment, in the manner V, before comprehensive importance of the base station or cell is determined, the importance degree of the static importance can be determined at first, for example, under the condition that the static importance is determined to be unimportant, the importance degree of the comprehensive importance is judged.

In an example embodiment, the static importance and the dynamic importance may be subjected to adding calculation to obtain the comprehensive importance; or the static importance and the dynamic importance may be subjected to weighted average calculation to obtain the comprehensive importance, wherein the static importance has a first weight coefficient, and the dynamic importance has a second weight coefficient. For example, if the static importance is 1, the dynamic importance is 2, the first weight coefficient is set to be 1, and the second weight coefficient is set to be 0.5, the comprehensive importance is equal to 1*1+2*0.5=2; if the third range is set to be (2, 3], then the working mode of the base station or cell cannot be determined to be the active mode, for example, can be determined to be the passive mode.

The embodiment further provides a device for determining a working mode. The device is configured to realize the method for determining a working mode. In addition, it should be noted that the device for determining a working mode, which is described in the device embodiments, corresponds to the method embodiments, and its specific implementation process has been described in detail in the method embodiment, so there is no need to repeat it again.

Figure 2:
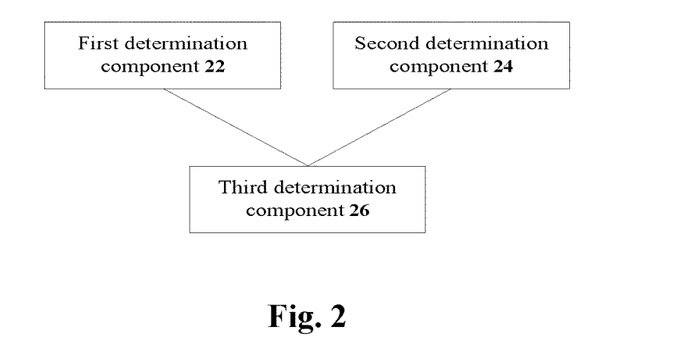
FIG. 2 is a structure diagram of a device for determining a working mode according to an embodiment of the present disclosure.

FIG. 2 is a structure diagram of a device for determining a working mode according to the embodiment of the present disclosure. As shown in FIG. 2, the device may include: a first determination component 22, a second determination component 24 and a third determination component 26, wherein the first determination component 22 is coupled to the third determination component 26, and is configured to determine static importance of a base station or cell according to static data of the base station or cell; the second determination component 24 is coupled to the third determination component 26, and is configured to determine dynamic importance of the base station or cell according to dynamic data of the base station or cell; the third determination component 26 is configured to determine the working mode of the base station or cell according to both the static importance and the dynamic importance.

The components and units involved in the embodiments of the present disclosure can be realized by either a software mode or a hardware mode. The components and the units in the embodiments can be installed in a processor, and for example, can be described as: a processor includes a first determination component 22, a second determination component 24 and a third determination component 26. It should be noted that the names of these components do not form a limitation to the components under a certain circumstance, for example, the first determination component can also be described as "a component configured to determine the static importance of the base station or cell according to the static data of the base station or cell".

It should be noted that the descriptions "first" "second" in the similar descriptions "first determination component" "second determination component" which are mentioned in the embodiment are only configured to identify the component or the unit, and shall not be understood that there is a limitation on the sequence aspect among these units or components.

In an example embodiment, the static data include at least one of the following information: position information of the base station or cell, a level of profit generated by the base station or cell, an importance grade of a deployed or planned role of the base station or cell, the number of VIP users in a service scope of the base station or cell, and a priority attribute of the base station or cell.

In an example embodiment, the first determination component 22 is further configured to determine the static importance according to configuration information indicative of the static importance.

In an example embodiment, the dynamic data include at least one of the following information: a current service volume situation of the base station or cell, the number of users accessing to the base station or cell, and the number of VIP users accessing to the base station or cell.

Figure 3:
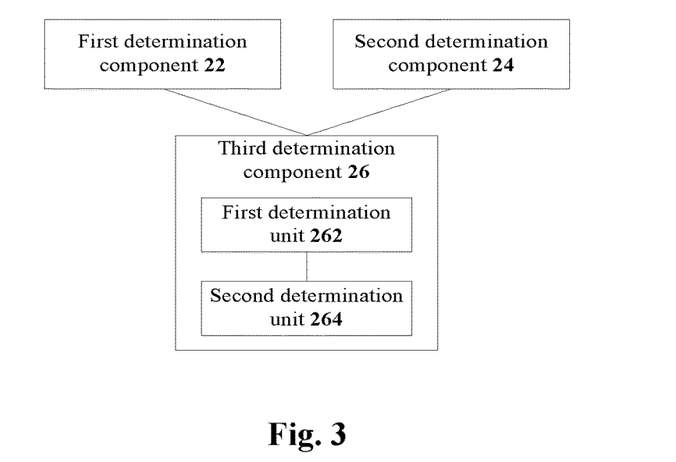
FIG. 3 is an example structure diagram I of a device for determining a working mode according to an embodiment of the present disclosure.

FIG. 3 is an example structure diagram I of a device for determining a working mode according to an embodiment of the present disclosure. As shown in FIG. 3, in an example embodiment, the third determination component 26 includes: a first determination unit 262 configured to determine that the static importance is in a first range and the dynamic importance is out of a second range, wherein the first range is a range representing that the static importance is important, and the second range is a range representing that the dynamic importance is important; a second determination unit 264 configured to determine that the working mode of the base station or cell is an active mode.

In an example embodiment, the first determination unit 262 is further configured to determine that the static importance is in a first range and the dynamic importance is in a second range, wherein the first range is a range representing that the static importance is important, and the second range is a range representing that the dynamic importance is important; the second determination unit 264 is configured to determine that the working mode of the base station or cell is an active mode.

In an example embodiment, the first determination unit 262 is further configured to determine that the static importance is out of a first range and the dynamic importance is in a second range, wherein the first range is a range representing that the static importance is important, and the second range is a range representing that the dynamic importance is important; the second determination unit 264 is configured to determine that the working mode of the base station or cell is an active mode.

In an example embodiment, the first determination unit 262 is further configured to determine that the static importance is out of a first range and the dynamic importance is out of a second range, wherein the first range is a range representing that the static importance is important, and the second range is a range representing that the dynamic importance is important; the second determination unit 264 is configured to determine that the working mode of the base station or cell is a passive mode.

Figure 4:
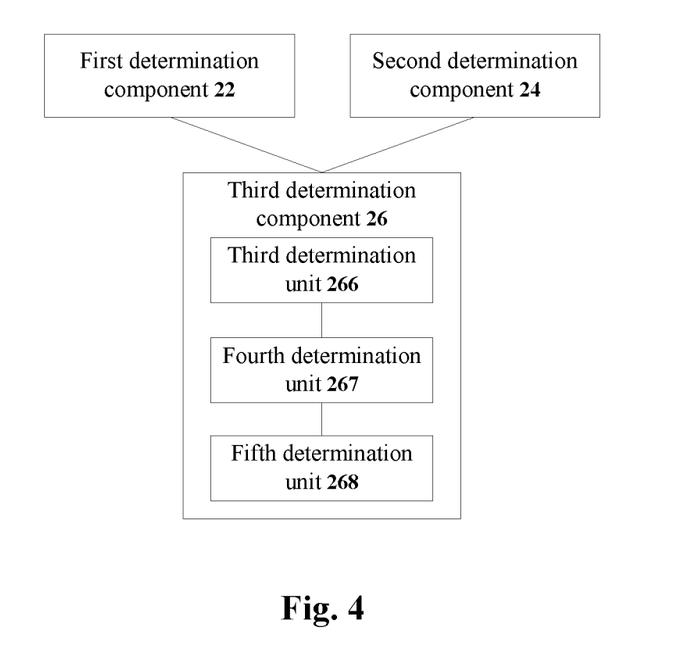
FIG. 4 is an example structure diagram II of a device for determining a working mode according to an embodiment of the present disclosure.

FIG. 4 is an example structure diagram II of a device for determining a working mode according to an embodiment of the present disclosure. As shown in FIG. 4, in an example embodiment, the third determination component 26 includes: a third determination unit 266 configured to determine comprehensive importance of the base station or cell according to both the static importance and the dynamic importance; a fourth determination unit 267 which is coupled to the third determination unit 266, and is configured to determine that the comprehensive importance is in a third range, wherein the third range is a range representing that the comprehensive importance is important; a fifth determination unit 268 which is coupled to the fourth determination unit 267, and is configured to determine that the working mode of the base station or cell is an active mode.

In an example embodiment, the device as shown in FIG. 4 further includes a sixth determination unit which is coupled to the third determination unit 266, and is configured to determine that the static importance is out of a first range, wherein the first range is a range representing that the static importance is important.

In an example embodiment, the static importance and the dynamic importance is subjected to adding calculation to obtain the comprehensive importance; or the static importance and the dynamic importance is subjected to weighted average calculation to obtain the comprehensive importance, wherein the static importance has a first weight coefficient, and the dynamic importance has a second weight coefficient.

The embodiment further respectively provides a network element, an element management system and a network management system, wherein the network element, or the element management system, or the network management system may respectively include the device for determining a working mode.

In an example embodiment, the network element may include a base station or other mobile communication equipment; the element management system is configured to manage a plurality of network elements; the network management system is configured to manage the network elements in one or more element management systems through a north interface.

The corresponding functional components, such as a processor and a transmitting and receiving station, in the network element, the element management system and the network management system can be configured to realize the corresponding functions of the device for determining a working mode, so there is no need to repeat them again.

The example embodiments are described and explained below.

The example embodiment relates to a method and a device for managing a wireless communication system, and provides a method and a device for determining a working mode of a base station or cell. In the example embodiment, a static judgment method and a dynamic judgment method for the importance of the base station or cell are combined to obtain the dynamic and static comprehensive importance of the base station or cell, and determine the working mode of the base station or cell according to the comprehensive importance, thus solving the problem that there is no complete method for determining the working mode of the base station or cell under an on-demand management mode at present.

A method for determining a working mode of a base station or cell, which is provided by the example embodiment, may include the following steps that:

Step 1: the static importance (for example, important or unimportant) of the base station or cell is determined according to static data or historical data (for example, the generated profit, the deployed and planned role, whether there is a VIP user in the service scope, and the like) of the static data of the base station or cell;

Step 2: if the static importance of one base station or cell is important, the working mode of the base station or cell is set to be an active mode; if the static importance of one base station or cell is unimportant, the base station or cell is subjected to dynamic importance analysis;

Step 3: if the analyzed dynamic importance of the base station or cell is important, the working mode of the base station or cell is set to be an active mode; if unimportant, the working mode of the base station or cell is set to be a passive mode.

Furthermore, the importance may be classified into different grades, for example:

1) the static importance grade (such as grade 1, grade 2, grade 3, and a greater value represents that it is more important) of the base station or cell is determined according to the static data (for example, the generated profit, the deployed and planned role, whether there is a VIP user in the service scope, and the like);

2) if the static importance grade of one base station or cell is higher than or equal to a static importance threshold (which is the highest grade 3 for example), the working mode of the base station or cell is set to be an active mode; if the static importance grade of one base station or cell is lower than a static importance threshold, the base station or cell is subjected to dynamic importance analysis, thus obtaining the dynamic importance grade (such as grade 1, grade 2, grade 3, and a greater value represents that it is more important) of the base station or cell;

3) the dynamic importance grade and the static importance grade of the base station or cell are subjected to comprehensive calculation (for example, adding, weighted average and the like), thus obtaining a comprehensive importance grade; if the comprehensive importance grade is higher than or equal to a comprehensive importance threshold (which is the highest grade 3 for example), the working mode of the base station or cell is set to be an active mode, or the working mode of the base station or cell is set to be a passive mode;

4) if a base station or cell has a priority attribute, the static importance grade of the base station or cell may be the same as the priority; or if the base station or cell has a priority attribute, the priority of the base station or cell can be taken as the static importance of the base station or cell, and is the same as the static importance grade of the base station or cell.

In an example embodiment, the value range of the importance grade can be enlarged, and the base stations or cells can be sequenced according to the importance values; then part of the base stations or cells with higher importance values are set to work in an active mode according to the proportion, and the other part of the base stations or cells are set to work in a passive mode. For example:

The value range of the importance grade is 1 to 100;

a static importance analysis component (located on the Network Management System (NMS) layer) determines the static importance grade (for example, 1 to 100, and a greater value represents that it is more important) of a cell according to the static data (such as the generated profit, the deployed and planned role, whether there is a VIP user in the service scope) of the cell;

a dynamic importance analysis component (located on the NMS layer or the Element Management System (EMS) layer) performs dynamic importance analysis on the cell according to the dynamic data of the cell, and obtains the dynamic importance grade (for example, 1 to 100, and a greater value represents that it is more important) of the cell;

a working mode setting component (located on the NMS layer or the EMS layer) performs comprehensive calculation (such as adding and weighted average) on the dynamic importance and the static importance of the cell, and obtains the comprehensive importance grade (the value range is from 1 to 100).

All the cells are sequenced according to the comprehensive importance, top N % (the greater the comprehensive importance value the more previous) of the cells are set to work in an active mode according to a preset active mode percentage (N %, for example 60%), and the other part of the cells are set to work in the passive mode.

If the dynamic importance analysis component is located on the EMS layer, the active mode percentage (N %) is transmitted to the EMS through the north interface;

the active mode percentage may be changed into an active mode quantity (N, for example 5,000). When the active mode quantity is used as a threshold for selecting the cells, top N cells are set to work in the active mode.

According to the method of the example embodiment, a device for determining a working mode of a base station or cell can be constructed, which includes the following parts:

a static importance analysis component which is located on the NMS layer and can work in an artificial mode or an automatic mode.

The artificial mode is to firstly obtain the static importance of the base station or cell by an artificial analysis mode, and then set the static importance of the base station or cell by artificially sending a static importance setting command.

The automatic mode is that there is a static importance analysis component on the NMS layer, which determines the static importance of the base station or cell by analyzing the static data and/or historical data (such as the generated profit, the deployed and planned role, whether there is a VIP user in the service scope) of the base station or cell, and then sets the static importance of the base station or cell by sending a static importance setting command.

The dynamic importance analysis component may be located on the network element, the EMS layer or the NMS layer, and in an example embodiment, it is located on the network element or the EMS layer.

The dynamic importance analysis component is configured to determine dynamic importance of the base station or cell according to the dynamic data (such as the service volume, the number of accessed terminals, and whether there is a VIP accessing to the base station or cell) of the base station or cell.

The base station working mode or cell working mode setting component may be located on the network element, the EMS layer or the NMS layer, and in an example embodiment, it is located on the network element or the EMS layer.

The base station working mode or cell working mode setting component is configured to set the working mode of the base station or cell according to both the static importance and the dynamic importance of the base station or cell. If the static importance of one base station or cell is important, the working mode of the base station or cell is set to be an active mode. If the static importance of one base station or cell is unimportant, but the dynamic importance is important, the working mode of the base station or cell is set to be an active mode; if the dynamic importance is unimportant neither, the working mode of the base station or cell is set to be a passive mode.

Under the condition that the importance is classified into different grades, the device for determining a working mode of a base station or cell may include:

a static importance analysis component which is located on the NMS layer and may work in an artificial mode or an automatic mode.

The artificial mode is to firstly obtain the static importance grade (for example grade 1, grade 2, grade 3, and a greater value represents that it is more important) of the base station or cell by an artificial analysis mode, and then set the static importance grade of the base station or cell by artificially sending a static importance setting command.

The automatic mode is that there is a static importance analysis component on the NMS layer, which determines the static importance grade of the base station or cell by analyzing the static data and/or historical data (such as the generated profit, the deployed and planned role, whether there is a VIP user in the service scope) of the base station or cell, and then sets the static importance grade of the base station or cell by sending a static importance setting command.

The dynamic importance analysis component may be located on the network element, the EMS layer or the NMS layer, and in an example embodiment, it is located on the network element or the EMS layer.

The dynamic importance analysis component is configured to determine the dynamic importance grade of the base station or cell according to the dynamic data (such as the service volume, the number of accessed terminals, and whether there is a VIP accessing to the base station or cell) of the base station or cell.

The base station working mode or cell working mode setting component may be located on the network element, the EMS layer or the NMS layer, and in an example embodiment, it is located on the network element or the EMS layer.

The base station working mode or cell working mode setting component is configured to perform comprehensive analysis on the static importance grade and/or the dynamic importance grade of the base station or cell, and set the working mode of the base station or cell according to an analysis result.

The comprehensive analysis here includes: If the static importance grade of one base station or cell is higher than or equal to a static importance threshold, the working mode of the base station or cell is set to be an active mode. If the static importance of one base station or cell is lower than the static importance threshold, further dynamic importance analysis is needed to be performed, thus obtaining the dynamic importance grade; the base station working mode or cell working mode setting component performs comprehensive calculation on the dynamic importance grade and the static importance grade to obtain the comprehensive importance grade; if the comprehensive importance grade is higher than or equal to a comprehensive importance threshold, the base station or cell is set to work in an active mode; if the comprehensive importance grade is lower than the comprehensive importance threshold, the base station or cell is set to work in a passive mode.

By the adoption of the method and the device, a static judgment method and a dynamic judgment method for the importance of the base station or cell are combined to obtain the dynamic and static comprehensive importance of the base station or cell, and the working mode of the base station or cell can be determined according to the comprehensive importance, thus solving the problem that there is no complete method for determining the working mode of the base station or cell under an on-demand management mode at present.

The technical solution of the example embodiment is described and explained below with the accompanying drawings.

Example Embodiment I

Figure 5:
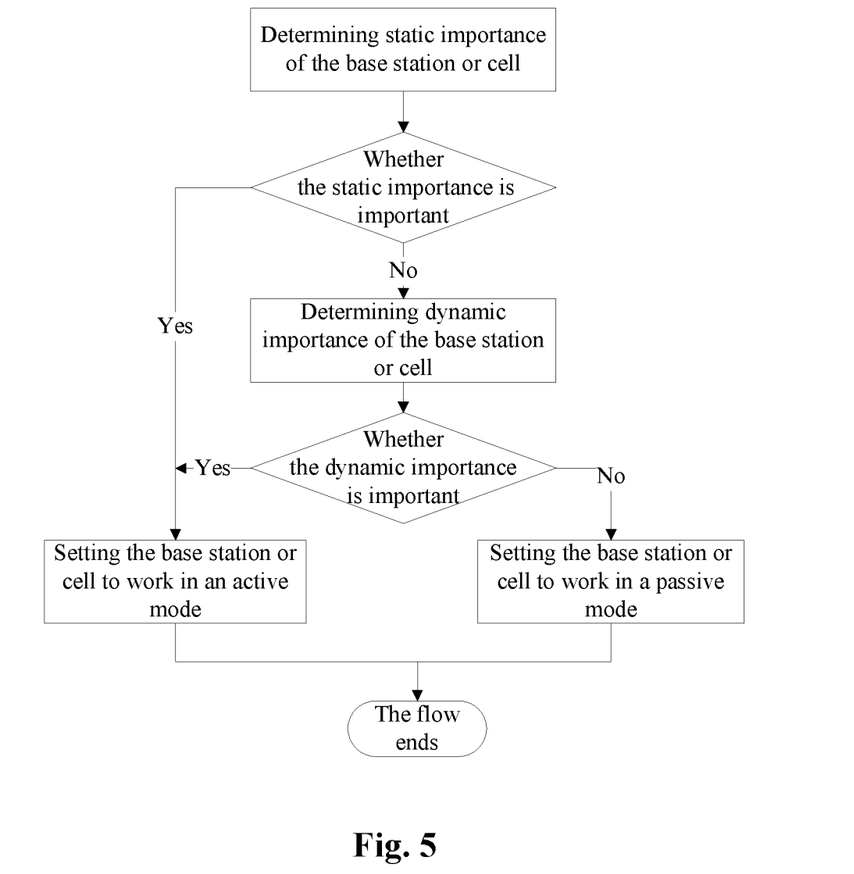
FIG. 5 is a flowchart of a method for determining a working mode of a base station or cell according to an example embodiment of the present disclosure.

FIG. 5 is a flowchart of a method for determining a working mode of a base station or cell according to an example embodiment of the present disclosure. As shown in FIG. 5, the flow may include the following steps that:

Step 51: a cell importance analysis functional component (which may be an artificial or automatic analysis program) on the NMS layer determines the static importance (important, unimportant) of a cell according to the static data (historical data such as the deployed and planned role, whether there is a VIP user in the service scope, the generated profit in the earlier stage and the service volume situation) of the cell;

Step 52: the NMS transmits the static importance of the cell to the EMS through the north interface;

Step 53: the EMS transmits the static importance of the cell to a corresponding base station;

Step 54: the base station performs further judgment and operation according to the static importance of the cell, for example:
  a) if the static importance of one cell is important, the working mode of the cell is set to be an active mode;
  b) if the static importance of one cell is unimportant, then:
    i. the cell is subjected to dynamic importance analysis;
    ii. the base station performs further judgment and operation according to a dynamic importance analysis result of the cell: if the analyzed dynamic importance of the cell is important, the working mode of the cell is set to be an active mode; if the analyzed dynamic importance of the cell is unimportant, the working mode of the cell is set to be a passive mode.

Example Embodiment II

Still with reference to FIG. 5 for explanation, the flow may include the following steps that:

Step 61: a cell importance analysis functional component on the NMS layer determines the static importance (important, unimportant) of a cell according to the static data or the historical data of the static data (such as the generated profit, the deployed and planned role, and whether there is a VIP user in the service scope) of the cell;

Step 62: the NMS transmits the static importance of the cell to the EMS through the north interface;

Step 63: the EMS performs judgment and corresponding operation according to the static importance of the cell, for example:
  a) if the static importance of the cell is important, the EMS transmits a configuration command to a corresponding base station to set the working mode of the cell to be an active mode;
  b) if the static importance of the cell is unimportant, then:
    i. the EMS performs dynamic importance analysis on the cell;
    ii. the EMS performs further judgment and operation according to a dynamic importance analysis result of the cell: if the analyzed dynamic importance of the cell is important, the EMS transmits a configuration command to a corresponding base station to set the working mode of the cell to be an active mode; if the analyzed dynamic importance of the cell is unimportant, the EMS transmits the configuration command to the corresponding base station to set the working mode of the cell to be a passive mode.

Example Embodiment III

Figure 6:
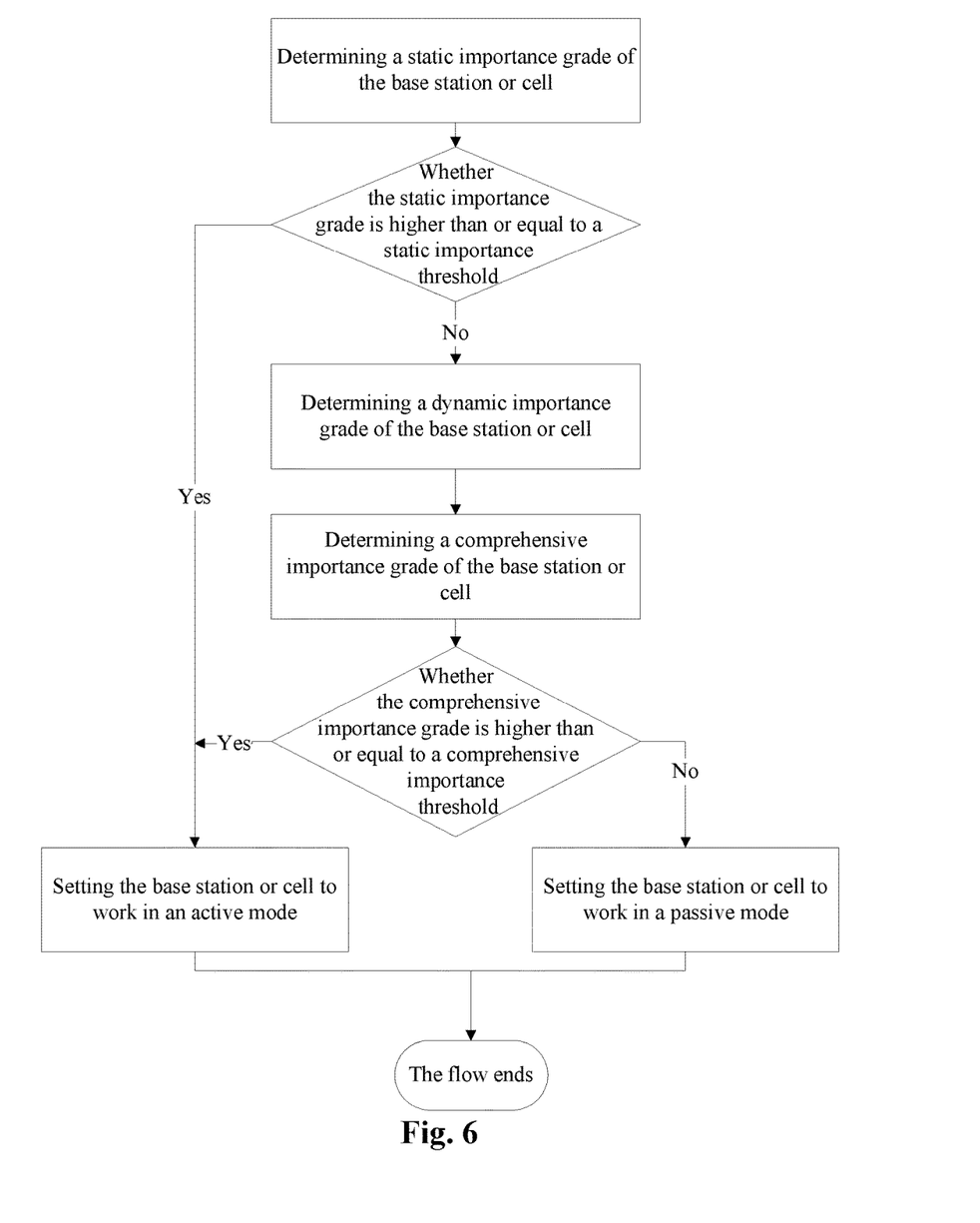
FIG. 6 is another flowchart of a method for determining a working mode of a base station or cell according to an example embodiment of the present disclosure.

FIG. 6 is another flowchart of a method for determining a working mode of a base station or cell according to an example embodiment of the present disclosure. As shown in FIG. 6, the enhanced method for determining a working mode of a base station or cell may include the following steps that:

Step 601: a base station importance analysis functional component on the NMS layer determines the static importance grade (such as grade 1, grade 2, grade 3, and a greater value represents that it is more important) of a base station according to the static data (such as the generated profit, the deployed and planned role, and whether there is a VIP user in the service scope) or the historical data of the static data of the base station;

Step 602: the NMS transmits the static importance of the base station to the EMS through the north interface;

Step 603: the EMS transmits the static importance grade of the base station to a corresponding base station;

Step 604: the base station performs further judgment and operation according to the static importance grade of the base station, for example:
  a) if the static importance of one base station is higher than or equal to a static importance threshold (the highest grade 3), the working mode of the base station is set to be an active mode;
  b) if the static importance of one base station is lower than the static importance threshold, then:
    i. the base station performs dynamic importance analysis by itself, thus obtaining the dynamic importance grade (grade 1, 2, 3, and a greater value represents that it is more important) of the base station;
    ii. the base station performs comprehensive calculation (adding) on the dynamic importance grade and the static importance grade of the base station to obtain the comprehensive importance grade; if the comprehensive importance grade is higher than or equal to a comprehensive importance threshold (which is 5 here as an example), the working mode of the base station is set to be an active mode, otherwise, the working mode of the base station is set to be a passive mode.

In an example embodiment, if the base station has a priority attribute, the static importance grade of the base station is the same as the priority; or if the base station has a priority attribute, the priority of the base station can be taken as the static importance of the base station, and is the same as the static importance grade of the base station.

In an example embodiment, when the working mode is set by taking the base station as a unit, the cells under the base station all adopt the working mode of the base station.

In an example embodiment, the above mentioned static importance threshold and the comprehensive importance threshold are both transmitted to the EMS by the NMS through the north interface, and then are transmitted to the base station through the EMS.

Example Embodiment VI

Still with reference to FIG. 6, the enhanced method for determining a working mode of a base station or cell may include the following steps that:

Step 701: a cell importance analysis functional component (which may be an automatic analysis program) on the NMS layer determines the static importance grade (such as grade 1, grade 2, grade 3, and a greater value represents that it is more important) of a cell according to the static data or the historical data of the static data (such as the generated profit, the deployed and planned role, and whether there is a VIP user in the service scope) of the cell;

Step 702: the NMS transmits the static importance grade of the cell to the EMS through the north interface;

Step 703: the EMS transmits the static importance grade of the cell to a corresponding base station;

Step 704: the base station performs further judgment and operation according to the static importance grade of the cell, for example:
  a) if the static importance grade of one cell is higher than or equal to a static importance threshold (the static importance grade is the highest grade 3), the working mode of the cell is set to be an active mode;
b) if the static importance grade of one cell is lower than the static importance threshold, then:
  i. the cell is subjected to dynamic importance analysis, thus obtaining the dynamic importance grade (grade 1, 2, 3, and a greater value represents that it is more important) of the cell;
  ii. the base station performs comprehensive calculation (for example adding and/or weighted average) on the dynamic importance grade and the static importance grade of the cell to obtain the comprehensive importance grade; if the comprehensive importance grade is higher than or equal to a comprehensive importance threshold (which is 3 here as an example), the working mode of the cell is set to be an active mode, otherwise, the working mode of the cell is set to be a passive mode.
  iii. the comprehensive calculation formula performed by the weighted average mode includes: comprehensive importance grade=(static importance grade×static importance grade coefficient+dynamic importance grade×dynamic importance grade coefficient)/(static importance grade coefficient+dynamic importance grade coefficient), in this example embodiment, the static importance grade coefficient is greater than 0 and less than or equal to 1, the dynamic importance grade coefficient is greater than 0 and less than or equal to 1, and static importance grade coefficient+dynamic importance grade coefficient is greater than 0 and less than or equal to 1.

In an example embodiment, if the cell has a priority attribute, the static importance grade of the cell is the same as the priority; or if the cell has a priority attribute, the priority of the cell can be taken as the static importance of the cell, and is equal to the static importance grade of the cell.

In an example embodiment, the above mentioned static importance threshold and the comprehensive importance threshold are both transmitted to the EMS by the NMS through the north interface, and then are transmitted to the base station through the EMS.

Example Embodiment V

Figure 7:
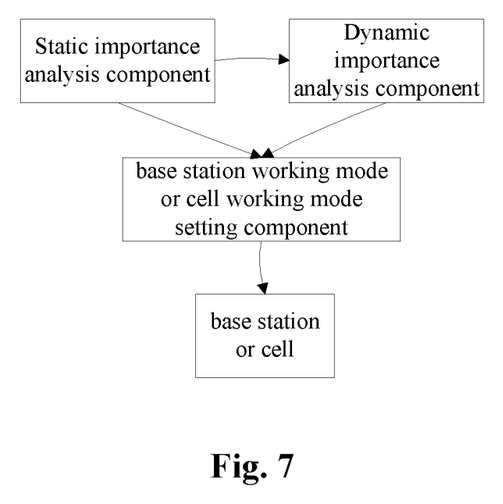
FIG. 7 is a working diagram of a device for determining a working mode of a base station or cell according to an example embodiment of the present disclosure.

FIG. 7 is a working diagram of a device for determining a working mode of a base station or cell according to an example embodiment of the present disclosure. As shown in FIG. 7, the device includes:

a static importance analysis component which is located on the NMS layer and may work in an artificial mode or an automatic mode. The artificial mode is to firstly obtain the static importance of the base station or cell by an artificial analysis mode, and then set the static importance of the base station or cell by artificially sending a static importance setting command. The automatic mode is that there is a static importance analysis component on the NMS layer, which determines the static importance of the base station by analyzing the static data and/or historical data (such as the generated profit, the deployed and planned role, whether there is a VIP user in the service scope) of the base station, and then sets the static importance of the base station or cell by sending a static importance setting command;

a dynamic importance analysis component which is located on the network element, and is configured to determine the dynamic importance of the base station according to the dynamic data (such as the service volume, the number of accessed terminals, and whether there is a VIP accessing to the base station) of the base station;

a base station working mode or cell working mode setting component which is located on the network element, is a working mode setting component, and is configured to set the working mode of the base station according to both the static importance and the dynamic importance of the base station. If the static importance of one base station is important, the working mode of the base station is set to be an active mode. If the static importance of one base station is unimportant, but the dynamic importance is important, the working mode of the base station is set to be an active mode; if the dynamic importance is unimportant neither, the working mode of the base station is set to be a passive mode.

Example Embodiment VI

Still with reference to FIG. 7 for explanation, the device may include:

a static importance analysis component which is located on the NMS layer and can work in an automatic mode, i.e., there is a static importance analysis component on the NMS layer, which determines the static importance grade of a cell by analyzing the static data or the historical data of the static data (such as the generated profit, the deployed and planned role, whether there is a VIP user in the service scope) of the cell, and then transmits the static importance grade of the cell to the EMS through the north interface;

a dynamic importance analysis component which is located on the EMS, and is configured to determine the dynamic importance grade of the cell according to the dynamic data (such as the service volume, the number of accessed terminals, and whether there is a VIP accessing to the base station or cell) of the cell;

a base station working mode or cell working mode setting component which is located on the EMS, and is configured to perform comprehensive analysis on the static importance grade and/or the dynamic importance grade of the cell to obtain the comprehensive importance grade of the cell, and set the working mode of the cell according to the comprehensive importance grade. If the static importance grade of one cell is higher than or equal to a static importance threshold, the working mode of the cell is set to be an active mode. If the static importance of one cell is unimportant, but the dynamic importance is important, the working mode of the cell is set to be an active mode; if the dynamic importance is unimportant neither, the working mode of the cell is set to be a passive mode. Otherwise, if the comprehensive importance grade of the cell is higher than or equal to the comprehensive importance threshold, the working mode of the cell is set to be an active mode, or the working mode of the cell is set to a passive mode.

By the embodiments, the example embodiments or implementation modes of the present disclosure, the problem caused by the adoption of a dynamic mode or a static mode to determine the working mode of the base station or cell is solved, and the determination on the working mode of the base station or cell is more reliable and effective.

INDUSTRIAL APPLICABILITY

According to the embodiments of the present disclosure, by the adoption of the method that determines the static importance of the base station or cell according to the static data of the base station or cell, determines the dynamic importance of the base station or cell according to the dynamic data of the base station or cell, and determines the working mode of the base station or cell according to both the static importance and the dynamic importance, the problem caused by the adoption of a dynamic mode or a static mode to determine the working mode of the base station or cell is solved, and the determination on the working mode of the base station or cell is more reliable and effective.

Obviously, those skilled in the art should know that each component or step of the present disclosure can be implemented by a universal computing device, and the components or steps can be concentrated on a single computing device or distributed on a network formed by a plurality of computing devices, and can optionally be implemented by programmable codes executable for the computing devices, so that the components or steps can be stored in a storage device for execution with the computing devices, or can form each integrated circuit component, or multiple components or steps therein can form a single integrated circuit component for implementation. As a consequence, the present disclosure is not limited to any specific hardware and software combination.

The above is only the example embodiment of the present disclosure and not intended to limit the present disclosure, and for the person skilled in the art, the present disclosure can have various modifications and variations. Any modifications, equivalent replacements, improvements and the like within the principle of the present disclosure shall fall within the range of protection defined by the claims of the present disclosure.

What is claimed is:

1. A method for determining a working mode, comprising:
   determining, by one of a network element, an element management system and a network management system, static importance of a base station or cell according to static data of the base station or cell;
   determining, by one of the network element, the element management system and the network management system, dynamic importance of the base station or cell according to dynamic data of the base station or cell;
   determining, by one of the network element, the element management system and the network management system, the working mode of the base station or cell according to both the static importance and the dynamic importance;
   wherein determining, by one of the network element, the element management system and the network management system, the working mode of the base station or cell according to both the static importance and the dynamic importance comprises:
   determining, by one of the network element, the element management system and the network management system, that the static importance is in a first range and the dynamic importance is out of a second range, wherein the first range is a range representing that the static importance is important, and the second range is a range representing that the dynamic importance is important; determining, by one of the network element, the element management system and the network management system, that the working mode of the base station or cell is an active mode;
   or determining, by one of the network element, the element management system and the network management system, that the static importance is in a first range and the dynamic importance is in a second range, wherein the first range is a range representing that the static importance is important, and the second range is a range representing that the dynamic importance is important; determining, by one of the network element, the element management system and the network management system, that the working mode of the base station or cell is an active mode;
   or determining, by one of the network element, the element management system and the network management system, that the static importance is out of a first range and the dynamic importance is in a second range, wherein the first range is a range representing that the static importance is important, and the second range is a range representing that the dynamic importance is important; determining, by one of the network element, the element management system and the network management system, that the working mode of the base station or cell is an active mode;
   or determining, by one of the network element, the element management system and the network management system, that the static importance is out of a first range and the dynamic importance is out of a second range, wherein the first range is a range representing that the static importance is important, and the second range is a range representing that the dynamic importance is important; determining, by one of the network element, the element management system and the network management system, that the working mode of the base station or cell is a passive mode;
   or determining, by one of the network element, the element management system and the network management system, comprehensive importance of the base station or cell according to both the static importance and the dynamic importance; determining, by one of the network element, the element management system and the network management system, that the comprehensive importance is in a third range, wherein the third range is a range representing that the comprehensive importance is important; determining, by one of the network element, the element management system and the network management system, that the working mode of the base station or cell is an active mode.

2. The method as claimed in claim 1, wherein the static data comprise at least one of the following information:
   position information of the base station or cell, a level of profit generated by the base station or cell, an importance grade of a deployed or planned role of the base station or cell, the number of Very Important Person (VIP) users in a service scope of the base station or cell, and a priority attribute of the base station or cell.

3. The method as claimed in claim 1, wherein determining, by one of the network element, the element management system and the network management system, the static importance comprises:
   determining, by one of the network element, the element management system and the network management system, the static importance according to configuration information indicative of the static importance.

4. The method as claimed in claim 1, wherein the dynamic data comprise at least one of the following information:
   a current service volume situation of the base station or cell, the number of users accessing to the base station or cell, and the number of VIP users accessing to the base station or cell.

5. The method as claimed in claim 1, wherein before determining, by one of the network element, the element management system and the network management system, the comprehensive importance of the base station or cell, the method further comprises:

determining, by one of the network element, the element management system and the network management system, that the static importance is out of a first range, wherein the first range is a range representing that the static importance is important.

6. The method as claimed in claim 5, wherein determining, by one of the network element, the element management system and the network management system, the comprehensive importance of the base station or cell according to both the static importance and the dynamic importance comprises:
  performing, by one of the network element, the element management system and the network management system, adding calculation on the static importance and the dynamic importance to obtain the comprehensive importance; or
  performing, by one of the network element, the element management system and the network management system, weighted average calculation on the static importance and the dynamic importance to obtain the comprehensive importance, wherein the static importance has a first weight coefficient, and the dynamic importance has a second weight coefficient.

7. The method as claimed in claim 1, wherein determining, by one of the network element, the element management system and the network management system, the comprehensive importance of the base station or cell according to both the static importance and the dynamic importance comprises:
  performing, by one of the network element, the element management system and the network management system, adding calculation on the static importance and the dynamic importance to obtain the comprehensive importance; or
  performing, by one of the network element, the element management system and the network management system, weighted average calculation on the static importance and the dynamic importance to obtain the comprehensive importance, wherein the static importance has a first weight coefficient, and the dynamic importance has a second weight coefficient.

8. A device for determining a working mode, comprising: comprises a hardware processor configured with a memory and execute program components stored on the memory, wherein the program components comprise:
  a first determination component configured to determine static importance of a base station or cell according to static data of the base station or cell;
  a second determination component configured to determine dynamic importance of the base station or cell according to dynamic data of the base station or cell;
  a third determination component configured to determine the working mode of the base station or cell according to both the static importance and the dynamic importance;
  wherein the third determination component comprises: a first determination unit configured to determine that the static importance is out of a first range and the dynamic importance is in a second range, wherein the first range is a range representing that the static importance is important, and the second range is a range representing that the dynamic importance is important; a second determination unit configured to determine that the working mode of the base station or cell is an active mode;
  or the third determination component comprises: a third determination unit configured to determine comprehensive importance of the base station or cell according to both the static importance and the dynamic importance; a fourth determination unit configured to determine that the comprehensive importance is in a third range, wherein the third range is a range representing that the comprehensive importance is important; a fifth determination unit configured to determine that the working mode of the base station or cell is an active mode;
  or the third determination component is further configured to determine that the static importance is in a first range and the dynamic importance is out of a second range, wherein the first range is a range representing that the static importance is important, and the second range is a range representing that the dynamic importance is important and determine that the working mode of the base station or cell is an active mode;
  or the third determination component is further configured to determine that the static importance is in a first range and the dynamic importance is in a second range, wherein the first range is a range representing that the static importance is important, and the second range is a range representing that the dynamic importance is important; and determine that the working mode of the base station or cell is an active mode;
  or the third determination component is further configured to determine that the static importance is out of a first range and the dynamic importance is out of a second range, wherein the first range is a range representing that the static importance is important, and the second range is a range representing that the dynamic importance is important; and determine that the working mode of the base station or cell is a passive mode.

9. A network element, comprising: the device for determining a working mode as claimed in claim 8.

10. An element management system, comprising: the device for determining a working mode as claimed in claim 8.

11. A network management system, comprising: the device for determining a working mode as claimed in claim 8.

* * * * *